United States Patent [19]
Nakano

[11] Patent Number: 5,917,366
[45] Date of Patent: Jun. 29, 1999

[54] VOLTAGE BOOSTER CIRCUIT AND A VOLTAGE DROP CIRCUIT WITH CHANGEABLE OPERATING LEVELS

[75] Inventor: Akihiro Nakano, Kawasaki, Japan

[73] Assignee: Fujitsu Limited, Kanagawa, Japan

[21] Appl. No.: 08/899,565

[22] Filed: Jul. 24, 1997

[30]     Foreign Application Priority Data

Mar. 14, 1997   [JP]   Japan ..................................... 9-060298

[51] Int. Cl.⁶ .................................................. H02M 3/18
[52] U.S. Cl. ............................. 327/536; 363/60; 307/110
[58] Field of Search .............................. 327/536; 363/59, 363/60; 307/110

[56]              References Cited

U.S. PATENT DOCUMENTS

| | | | |
|---|---|---|---|
| 4,236,199 | 11/1980 | Stewart | 363/60 |
| 5,499,183 | 3/1996 | Kobatake | 363/60 |
| 5,680,300 | 10/1997 | Szepesi et al. | 363/59 |

*Primary Examiner*—Kenneth B. Wells
*Attorney, Agent, or Firm*—Nikaido Marmelstein Murray & Oram, LLP

[57]              ABSTRACT

Disclosed is a voltage booster or drop circuit. The voltage booster or drop circuit includes: a plurality of diode devices connected in series; a plurality of capacitors, first electrodes of which are connected to connection points of the diode devices, for which a pulse signal is supplied to second electrodes of the capacitors and a raised voltage or dropped voltage is output to the last stage of the diode devices; and pulse generation device. The pulse generation device supplies a first pulse signal to the second electrodes of odd numbered capacitors and supplies a second pulse signal, the phase of which is opposite that of the first pulse signal, to the second electrodes of even numbered capacitors. In a second condition which is different from the first condition, the pulse generation device supplies a third pulse signal to the second electrodes of odd numbered at least one pair of capacitors and supplies a fourth pulse signal, the phase of which is opposite that of the third pulse signal, to the second electrodes of even numbered at least one pair of capacitors.

12 Claims, 14 Drawing Sheets

5,917,366

VOLTAGE BOOSTER CIRCUIT AND A VOLTAGE DROP CIRCUIT WITH CHANGEABLE OPERATING LEVELS

BACKGROUND OF THE INVENTION

1. Field of the Invention

The present invention relates to a circuit for employing pulse signals in a reverse phase to raise a voltage until it is equal to or higher than a predetermined power voltage, or to drop a voltage until it is equal to or lower than the predetermined power voltage, such as ground. In particular, the present invention pertains to a voltage booster circuit or a voltage drop circuit, the booster level or the drop level of which can be changed as needed.

2. Related Art

In a semiconductor device, a voltage booster circuit and a voltage drop circuit are employed to generate a voltage higher than a power source voltage and to generate a voltage lower than a power source voltage, such as ground. In a nonvolatile memory used for flash memory, for example, a voltage booster circuit is used for a write circuit and a voltage drop circuit is used for an erasing circuit, and a voltage that is raised or dropped by such a circuit is applied to a word line and a bit line, to which a memory cell is connected.

FIG. 18 is a diagram illustrating a common voltage booster circuit. In this voltage booster circuit, N MOS transistors Q11, Q12, Q13 and Q14 which are connected as a diode are connected in series, and capacitors C11, C12, C13 and C14 are connected to their connection points. Power source Vcc is connected to the drain terminal of the transistor Q11 which is connected as a diode at the first stage, and output OUT is connected to the source terminal of the transistor Q14 which is connected as a diode at the last stage. As is shown in FIG. 18, clock pulses having opposite phases, CLK and CLKB, are alternately applied to the capacitors C, and through the voltage raising operation of the capacitors C, electric charges are transferred, progressively, from individual nodes N1, N2, N3 and N4 to their adjacent nodes toward the last stage. As a result, a voltage obtained by raising about five times the power source voltage Vcc that is the amplitude of a clock pulse is generated at the output OUT.

FIG. 19 is a diagram illustrating a common voltage drop circuit. In this voltage drop circuit, P-MOS transistors Q21, Q22, Q23 and Q24 which are connected as a diode are connected in series, and capacitors C21, C22, C23 and C24 are connected to their connection points. Power source ground GND is connected to the drain terminal of the transistor Q21, which is connected as a diode at the first stage, and output OUT is connected to the source terminal of the transistor Q24, which is connected as a diode at the last stage. As is shown in FIG. 19, clock pulses having opposite phases, CLK and CLKB, are alternately applied to the capacitors C, and through the voltage drop operation of the capacitors C, electric charges are transferred, progressively, from nodes P1, P2, P3 and P4 to their adjacent nodes toward the first stage. As a result, a negative voltage obtained by dropping by about four times the power source voltage Vcc that is the amplitude of the clock pulse is generated at the output OUT.

As is described above, when clock pulses in opposite phases are respectively supplied to odd numbered capacitors and even numbered capacitors, a voltage can be generated that is obtained by raising or dropping the power voltage integer times. In addition, when more circuits constituted by transistors connected as a diode and capacitors are provided, either a higher or a lower voltage can be generated.

When, for example, both 3 V and 5 V are employed as power voltages to be supplied to the semiconductor device, for a voltage booster circuit or a voltage drop circuit designed for 3 V, a voltage higher than a designed voltage may be applied to the nodes when the power voltage of 5 V is applied, and transistors and capacitors may be damaged. Generally, the generation of a desired voltage that does not depend on a supplied power voltage is required. Even when a high power voltage is applied, therefore, it is not required that an accompanying high or low voltage be generated.

Even in a case where a plurality of voltages are not applicable as the power voltage, if a power voltage to be applied is raised, the same problem arises as is described above, that devices in the voltage booster circuit or the voltage drop circuit will be damaged.

SUMMARY OF THE INVENTION

To resolve the above shortcomings, it is one object of the present invention to provide a voltage booster circuit or voltage drop circuit for which the boosting level or the dropping level can be changed as needed, even if the various power source voltages are supplied to the circuits.

It is another object of the present invention to provide a voltage booster circuit or a voltage drop circuit for which the booster level or the drop level can be changed when elements in the voltage booster or in the voltage drop circuit may be damaged.

To achieve the above object, according to the present invention, a voltage booster or drop circuit comprises:

a plurality of diode means connected in series;

a plurality of capacitors, first electrodes of which are connected to connection points of the diode means, for which a pulse signal is supplied to second electrodes of the capacitors and a raised voltage or dropped voltage is output to the last stage of the diode means; and pulse generation means for, in a first condition, supplying a first pulse signal to the second electrodes of odd numbered capacitors and supplying a second pulse signal, the phase of which is opposite that of the first pulse signal, to the second electrodes of even numbered capacitors, and for, in a second condition differing from the first condition, supplying a third pulse signal to the second electrodes of odd numbered at least one pair of capacitors and supplying a fourth pulse signal, the phase of which is opposite that of the third pulse signal, to the second electrodes of even numbered at least one pair of capacitors.

According to the present invention, the voltage boosting level or dropping level can be changed by changing a pulse signal combination. Damage to devices in the circuit can be prevented by altering as needed the voltage level, for example, in accordance with the change in the power voltage.

Further, to achieve the above objects, according to the present invention, a voltage booster or voltage drop circuit comprises:

a plurality of diode means, connected in series, for transferring electric charges from a first stage toward a last stage, or vice versa;

a plurality of capacitors, first electrodes of which are connected to connection points of the diode means, for which a pulse signal is applied to second electrodes of the capacitors to raise or drop a voltage at the connection points;

a pulse generator for applying, in a first condition, a first combination of pulse signals having opposite phases to the second electrodes of the capacitors, and for, in a second condition differing from the first condition, applying a second combination of pulse signals having opposite phases, which differs from the first combination, to the second electrodes of the capacitors. The pulse signal combination can be changed as needed.

DETAILED DESCRIPTION OF THE PREFERRED EMBODIMENT

The preferred embodiment of the present invention will now be described while referring to the accompanying drawings. The technical scope of the present invention, however, is not limited by the embodiment.

Figure 1:
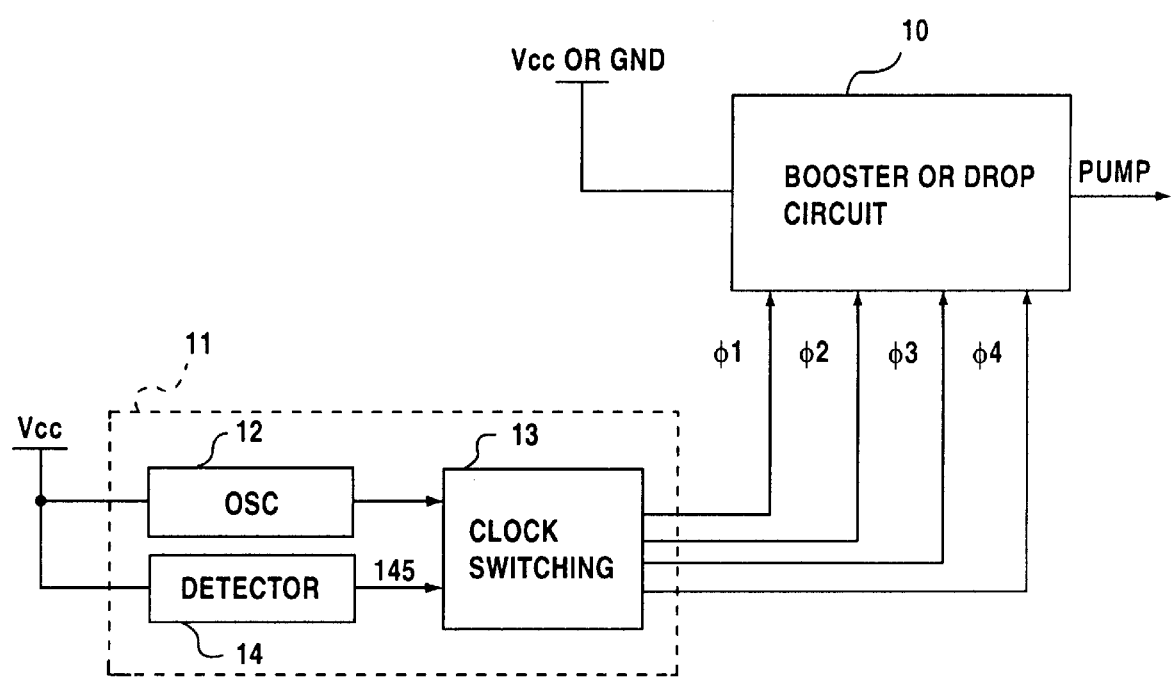
FIG. 1 is a block diagram illustrating an overall block diagram of a voltage booster or drop circuit according to one embodiment of the present invention.
Figure 18:
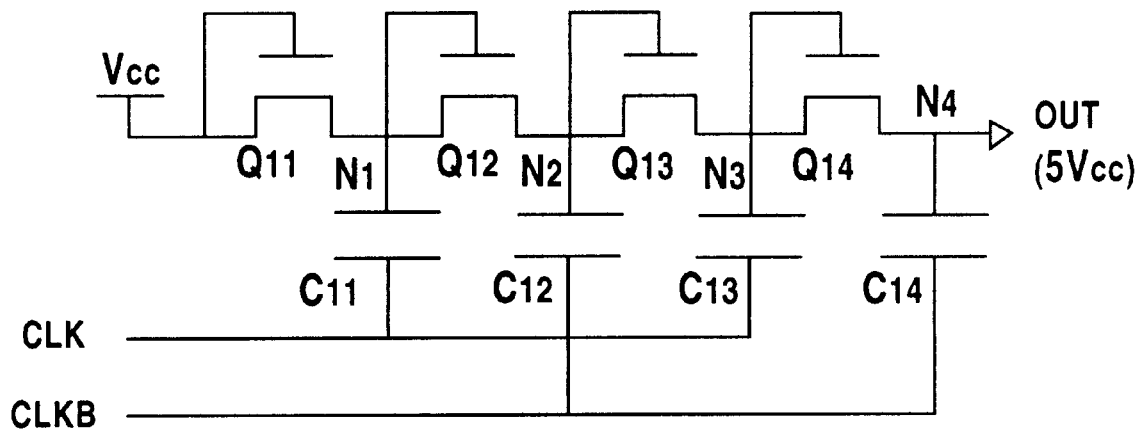
FIG. 18 is a diagram illustrating a common voltage booster circuit.
Figure 19:
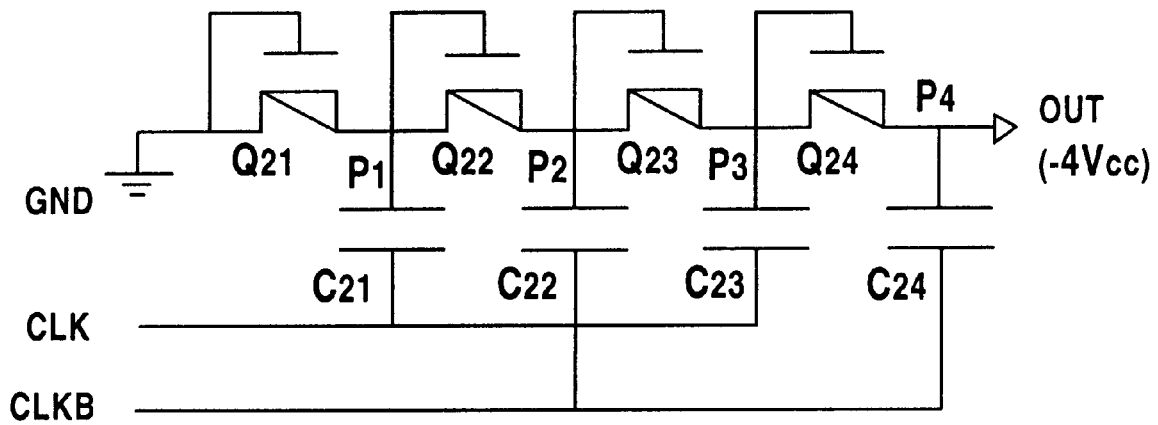
FIG. 19 is a diagram illustrating a common voltage drop circuit.
Figure 18:
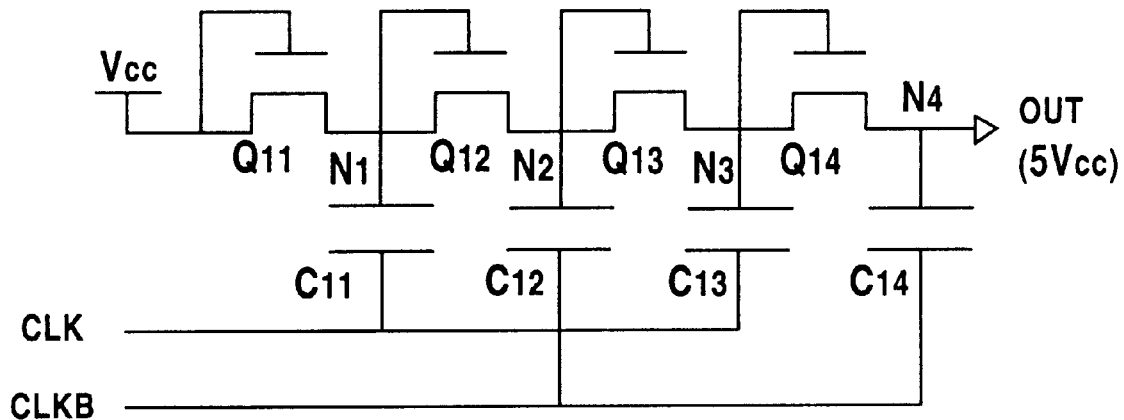
Figure 19:
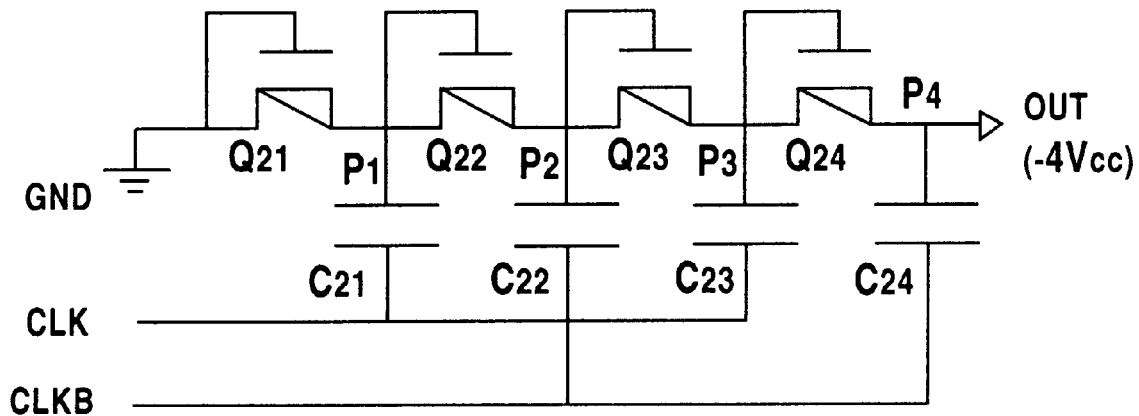

FIG. 1 is a block diagram illustrating a voltage booster or drop circuit according to one embodiment of the present invention. A voltage booster or drop circuit 10 is constituted by the diodes and capacitors as shown in FIG. 18 or 19. In this embodiment, four clock pulses $\phi 1$, $\phi 2$, $\phi 3$ and $\phi 4$ are generated by a pulse generator 11 and are transmitted to the voltage booster or drop circuit 10 where diodes and capacitors in four stages are connected in series. The pulse generator 11 generates different combinations of clock pulses under the first condition and the second condition, and transmits them to the voltage booster or drop circuit 10.

The pulse generator 11 includes, for example, a clock oscillator 12, a detection circuit 14 for detecting the first and the second condition, and a clock switching circuit 13 for switching combinations of clock pulses generated by the clock oscillator 12 in accordance with the output of the detection circuit 14. In this example, the detection circuit 14 identifies the first condition, wherein power source voltage Vcc is low, and the second condition, wherein the power source voltage Vcc is high. In addition, the detection circuit 14 may detect a third condition, wherein the power source voltage Vcc is much higher than the second condition.

In accordance with the result obtained by the detection circuit 14, the clock switching circuit 13 selects a combination of clock pulses of a positive phase and a negative phase based on the clock pulse from the oscillator 12, and generates four clock pulses $\phi 1$ through $\phi 4$.

Figure 2:
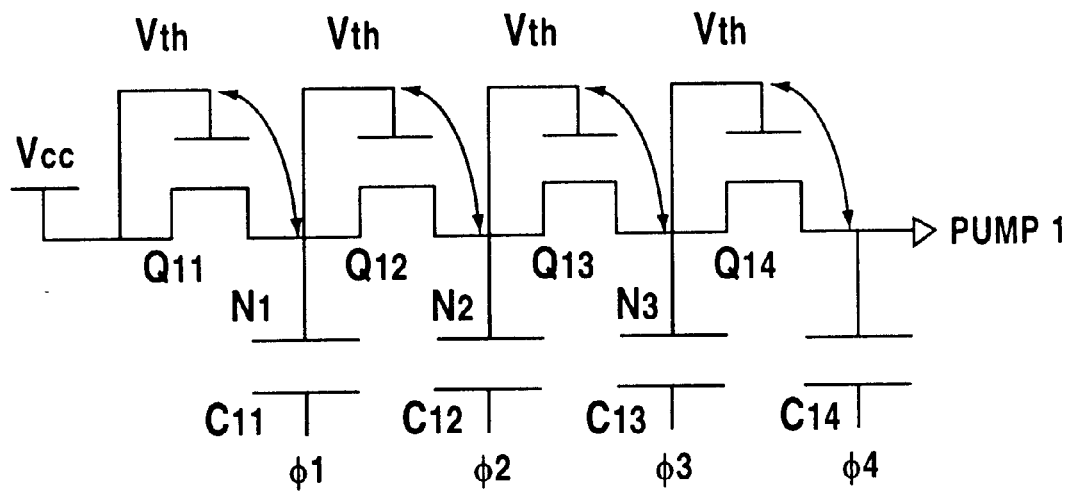
FIG. 2 is a circuit diagram showing a voltage booster circuit employed as the voltage booster or drop circuit in FIG. 1.

FIG. 2 is a diagram illustrating a voltage booster circuit that is used for the voltage booster or drop circuit 10 in FIG. 1. This circuit is substantially the same as the circuit shown in FIG. 18. More specifically, power source Vcc is connected to the drain terminal of N-MOS transistor Q11 connected as a diode at the first stage, and output PUMP1 is connected to the source terminal of N-MOS transistor Q14 connected as a diode at the last stage. Capacitors C11 through C14 are connected to nodes N1 through N3 of the N-MOS transistors connected as a diode at the stages.

Figure 3:
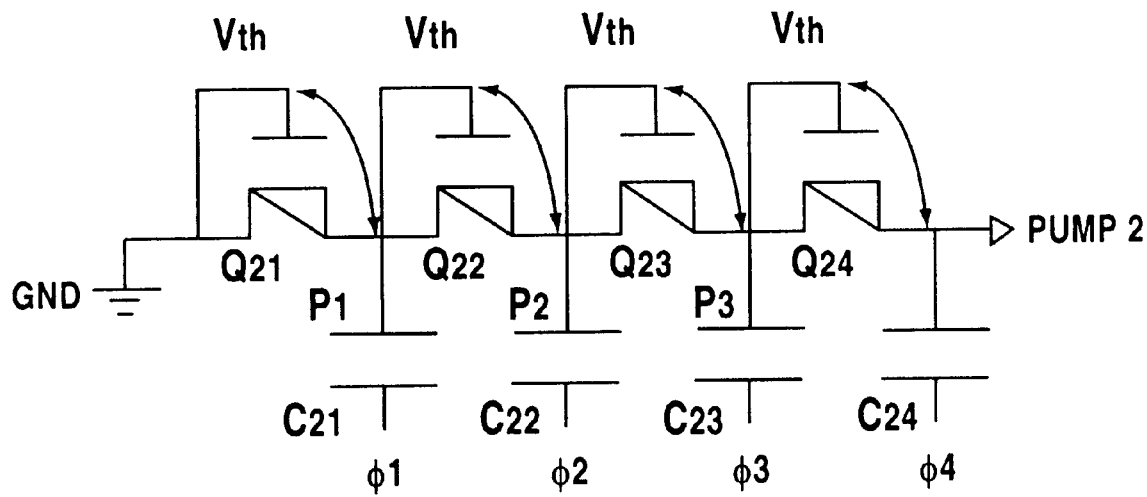
FIG. 3 is a circuit diagram showing a voltage drop circuit employed as the voltage booster or drop circuit in FIG. 1.

FIG. 3 is a diagram illustrating a voltage drop circuit employed as the voltage booster or drop circuit 10 in FIG. 1. This circuit is substantially the same as the circuit shown in FIG. 19. More specifically, power source ground GND is connected to the drain terminal of P-MOS transistor Q21 connected as a diode at the first stage. Output PUMP2 is connected to the source terminal of P-MOS transistor Q24 at the last stage. Capacitors C21 through C24 are connected in the manner shown in FIG. 3.

Clock pulses $\phi 1$ through $\phi 4$ are applied to the electrodes of capacitors in the voltage booster circuit or the voltage drop circuit in FIGS. 2 and 3. Conventionally, clock pulses of positive and negative phases are respectively applied to the odd numbered capacitors and even numbered capacitors. In this embodiment, however, a combination of clock pulses $\phi 1$ to $\phi 4$ of the positive phase and of the negative phase is changed, as needed, in accordance with the condition identified by the detection circuit 14.

Figure 4:
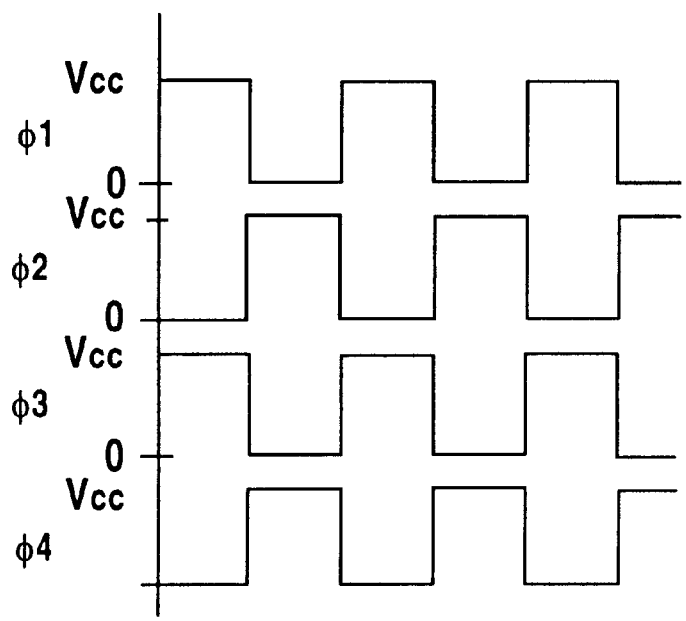
FIG. 4 is a diagram showing a first combination of clock pulses 1 through 4.

FIG. 4 is a diagram showing the first combination of clock pulses $\phi 1$ to $\phi 4$. In this combination, clock pulses $\phi 1$ and $\phi 3$, which are to be applied to the odd numbered capacitors C11 and C13, have an opposite phase to those of clock pulses $\phi 2$ and $\phi 4$, which are to be applied to the even numbered capacitors C12 and C14. This combination is the same as was explained for the prior art.

As is described above, upon application of the first combination of clock pulses to the voltage booster circuit, a voltage about five times as high as the power voltage Vcc is generated at the output PUMP1. And upon application of the first combination of clock pulses to the voltage drop circuit, a voltage about four times as low as the ground power voltage Vcc is generated at the output PUMP2. This principle will be described in detail later.

Figure 5:
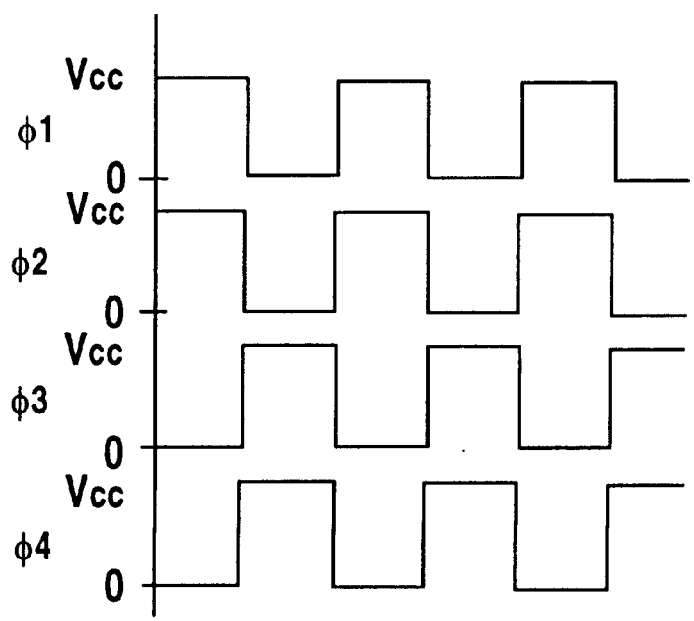
FIG. 5 is a diagram showing a second combination of clock pulses 1 through 4.

FIG. 5 is a diagram showing the second combination of clock pulses φ1 to φ4. In this example, clock pulses φ1 and φ2 to be applied to the capacitors at the first and the second stages have the same phase, and clock pulses φ3 and φ4 to be applied to the capacitors at the third and fourth stages have a phase opposite of the preceding phase.

Upon application of this combination to the voltage booster circuit, a voltage about three times as high as the power voltage Vcc is generated at output PUMP1. Upon application of this combination to the voltage drop circuit, a voltage about two times as low as the power voltage Vcc is generated at output PUMP2.

Figure 6:
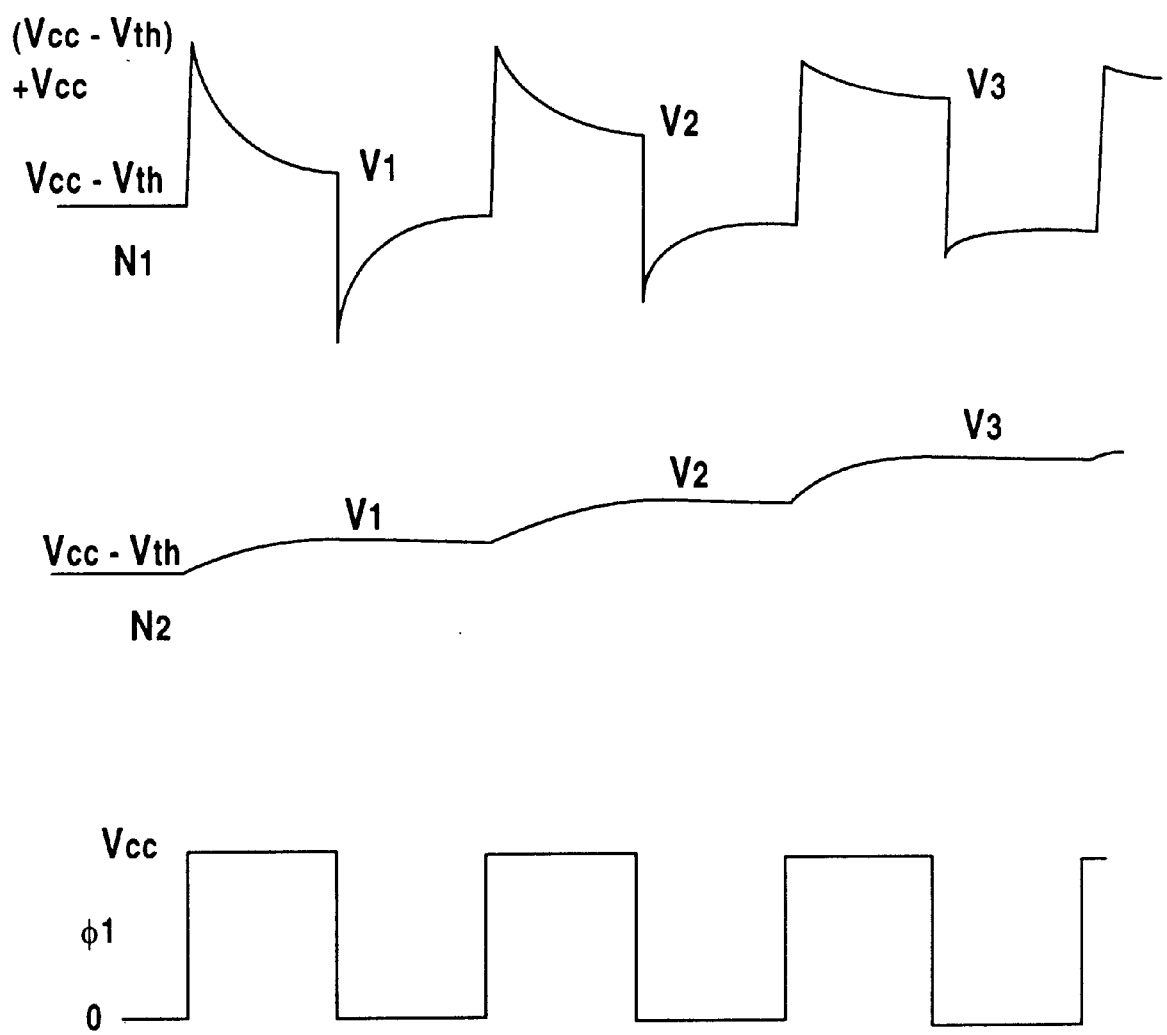
FIG. 6 is a waveform diagram for clock pulse 1 and nodes N1 and N2 for explaining a voltage boosting operation.
Figure 7:
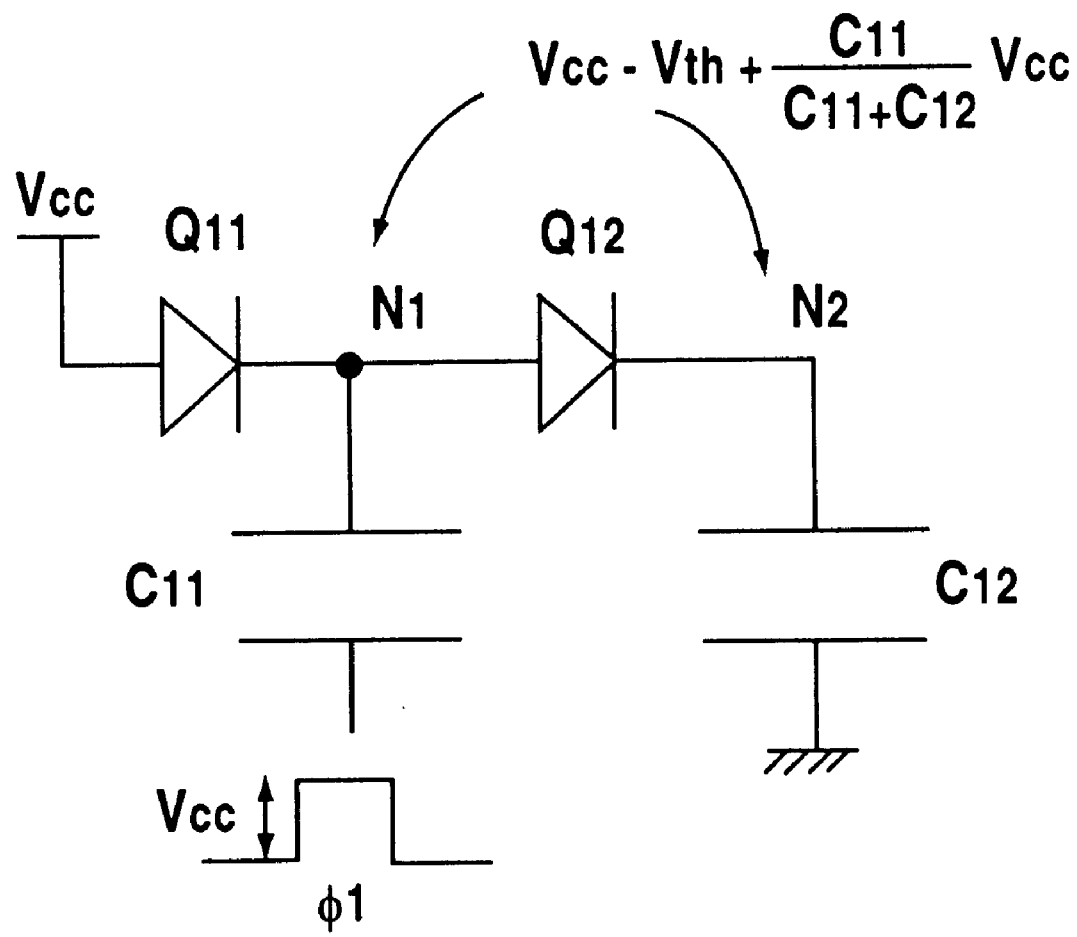
FIG. 7 is a simplified diagram illustrating a voltage booster circuit for understanding the operation in FIG. 6.

An explanation will be given for the operation of the voltage booster circuit when the combination of clock pulses φ1 through φ4 is changed. FIG. 6 is a waveform diagram of clock pulse φ1 and nodes N1 and N2 for explaining the voltage boosting operation. FIG. 7 is a simplified diagram of a voltage booster circuit for understanding the operation.

Assume that, as is shown in FIG. 7, the circuit is constituted by the transistors Q11 and Q12 connected as diodes and the capacitors C11 and C12, and that clock pulse φ1 is applied to the capacitor C11 and the capacitor C12 is fixed to a ground potential. As is shown in FIG. 6, the potential at the first node N1 is a voltage(Vcc−Vth) lower than the power source voltage Vcc the equivalent of a threshold voltage Vth of the transistor Q11. Suppose then that in this case the first potential of the node N2 is also Vcc−Vth. When clock pulse φ1 is changed from level L, which is a ground potential, to level H by an amplitude equivalent to power voltage Vcc, the potential at the node N1 is raised to Vcc−Vth+Vcc by the coupling of the capacitor C11. The electric charges in the capacitor C11 are supplied to node N2 via the transistor Q12, which is connected as the diode, and accordingly, the potential at the node N2 is increased.

When clock pulse φ1 is changed from level H to level L, the electric charges are supplied from the power source Vcc via the transistor Q11, and the potential at the node N1 does not fall. As a result, if the threshold voltage Vth of the transistor Q12 is disregarded, the potentials at the nodes N1 and N2 are higher by the equivalent of a voltage distributed at a ratio of the capacitances of the capacitors C11 and C12. That is, voltage V1 in FIG. 6 is expressed as:

$$V1=Vcc-Vth+\{C11/(C11+C12)\}Vcc \quad (1)$$

Similarly, upon application of clock pulse φ1, the potential at the node N2 is further increased. Finally, the potential at the node N1 is raised or dropped within a range of from Vcc−Vth to 2Vcc−Vth, and the potential at the node N2 reaches 2(Vcc−Vth).

Figure 8:
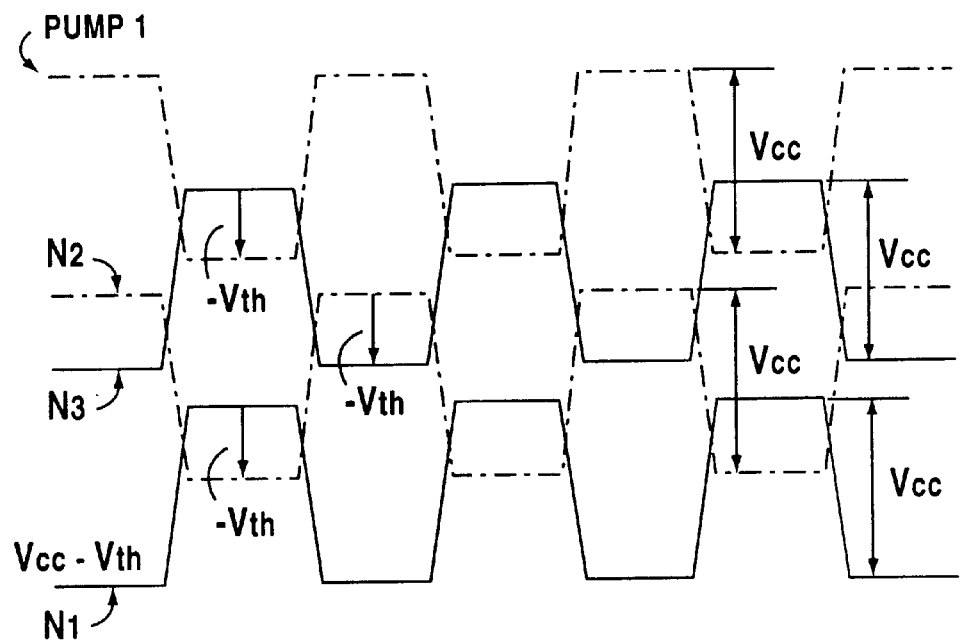
FIG. 8 is a diagram showing signals at nodes N1, N2 and N3 and output PUMP1 of a voltage booster circuit in a normal condition wherein a combination of clock pulses in FIG. 4 is applied.

FIG. 8 is a diagram showing signals at nodes N1, N2 and N3 and output PUMP1 of the voltage booster circuit in the normal condition when the combination of clock pulses shown in FIG. 4 is applied. The levels of the signals at the nodes N1 to N3 and the output PUMP1 are varied within the following ranges:

N1: Vcc−Vth 2Vcc−Vth

N2: 2(Vcc−Vth) Vcc+2(Vcc−Vth)

N3: 3(Vcc−Vth) Vcc+3(Vcc−Vth)

PUMP1: 4(Vcc−Vth) Vcc+4(Vcc−Vth).

Therefore, when the circuit is so changed that the threshold voltages Vth of the transistors connected as the diodes are small, or that the voltages between the gates and the sources are at the same level, a voltage raised to 2Vcc is generated at the node N1, a voltage raised to 3Vcc is generated at the node N2, a voltage raised to 4Vcc is generated at the node N3, and a voltage raised to 5Vcc is generated at the output PUMP1.

Figure 9:
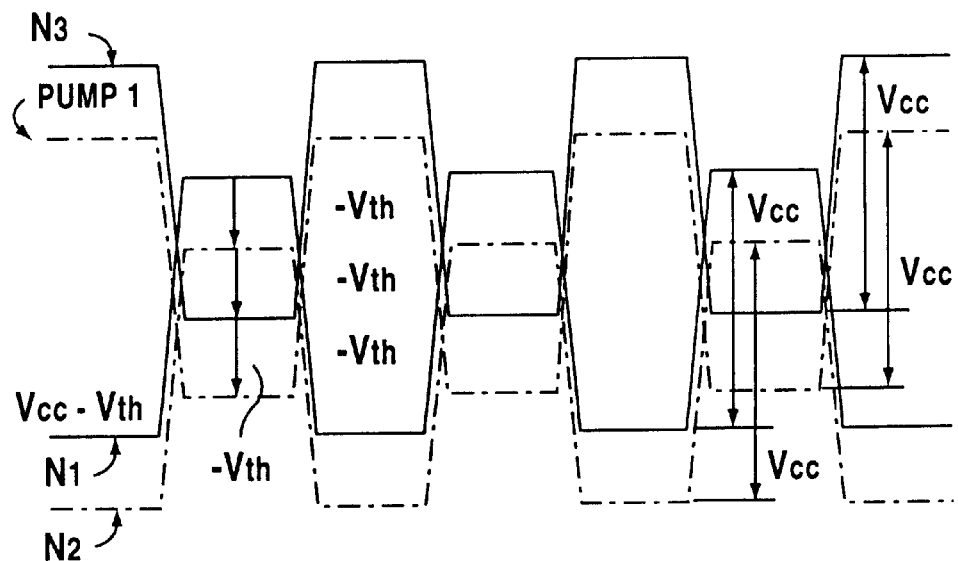
FIG. 9 is a diagram showing signals at nodes N1, N2 and N3 and output PUMP1 of a voltage booster circuit in a normal condition wherein a combination of clock pulses in FIG. 5 is applied.
Figure 10A:
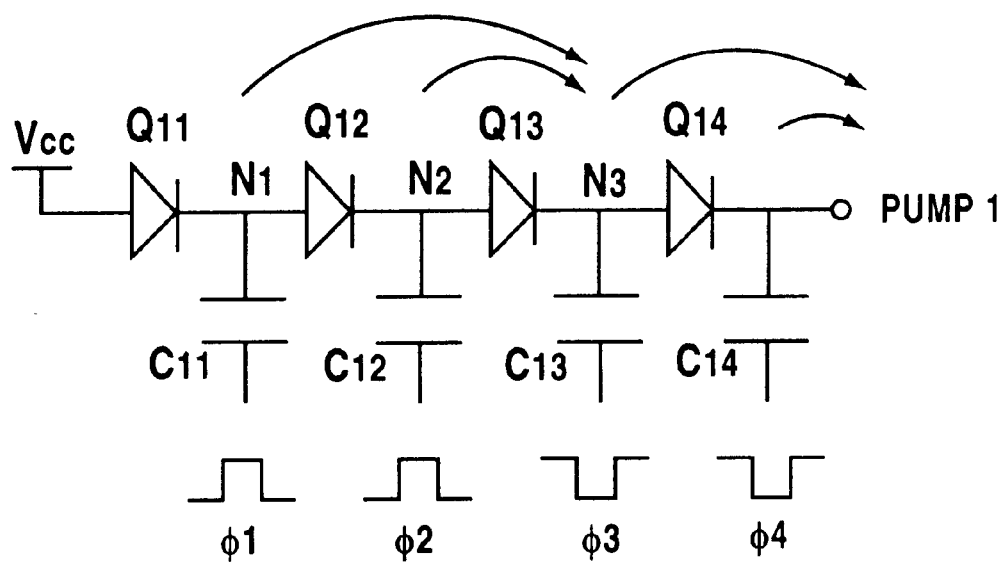
FIGS. 10A and 10B are circuit diagrams for explaining an operation whereby the combination of clock pulses in FIG. 5 is applied to the voltage booster circuit.
Figure 10B:
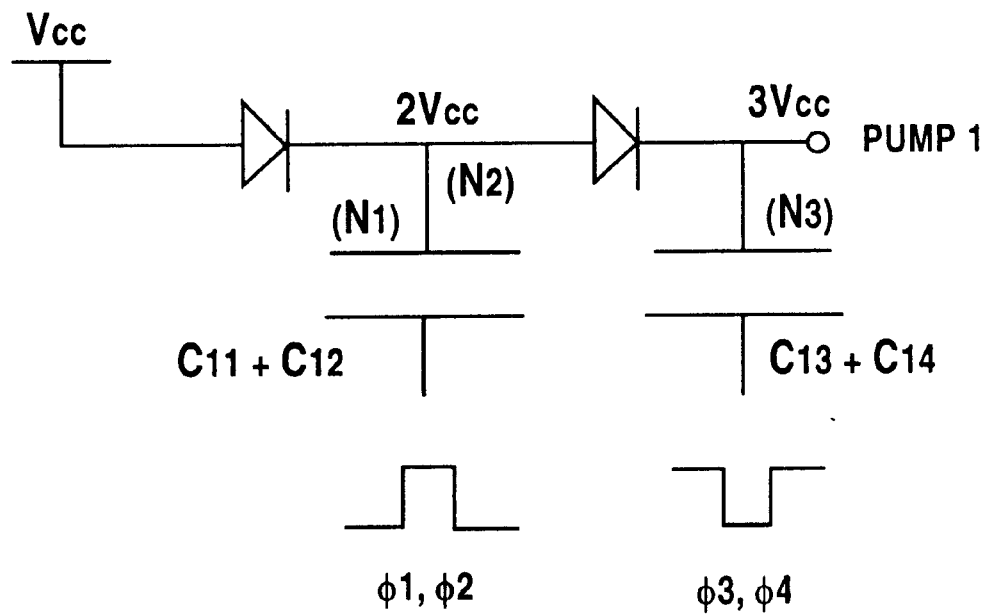

FIG. 9 is a diagram showing signals at nodes N1, N2 and N3 and output PUMP1 of the voltage booster circuit in the normal condition when the combination of clock pulses in FIG. 5 is applied. FIGS. 10A and 10B are circuit diagrams for explaining the operation when the combination of clock pulses in FIG. 5 is applied to the voltage booster circuit.

As is shown in FIG. 10A, in accordance with the combination of clock pluses in FIG. 5, clock pulses φ1 and φ2 in the same phase are applied to the capacitors C11 and C12, and clock pulses 3 and 4 in the opposite phase are applied to the capacitors C13 and C14. Therefore, when, for example, the clock pulses φ1 and φ2 are generated, the voltage is raised by the capacitors C11 and C12, and the electric charges of the capacitors C11 and C12 are transferred in the direction indicated by the arrow in FIG. 10A, thereby raising the voltages at the node N3 and at the output PUMP1.

The circuit in FIG. 10A, therefore, performs an operation that is the equivalent of the circuit shown in FIG. 10B. More specifically, the capacitors C11 and C12 and the capacitors C13 and C14 are connected to the cathodes of two diodes, and the same operation is performed as when clock pulses having opposite phases are applied to these capacitors. If the threshold voltages of the transistors constituting the diodes are disregarded, the voltages at the nodes N1 and N2 vary between Vcc and 2Vcc, and the voltages at the node N3 and the output PUMP1 vary between 2Vcc and 3Vcc. As a result, a voltage approximately three times as high as the power voltage Vcc is generated at the output PUMP1.

It should be noted that a difference equivalent to threshold voltage Vth exists between the voltages at the nodes N1 and N2, and also between the voltages at the node N3 and the output PUMP1. The voltages at the nodes N1 and N2 are raised or reduced between Vcc and 2Vcc, while the difference therebetween of the threshold values Vth is maintained. Similarly, the voltages at the node N3 and the output PUMP1 are changed, while the difference therebetween of the threshold values Vth is maintained.

The operation of the above voltage booster circuit will be more apparent by referring to FIG. 9. The signals at the nodes N1 to N3 and the output PUMP1 are changed between the following levels:

N1: Vcc−Vth Vcc+(Vcc−Vth)

N2: Vcc−2Vth Vcc+(Vcc−2Vth)

N3: 2Vcc−3Vth Vcc+(2Vcc−3Vth)

PUMP1: 2Vcc−4Vth Vcc+(2Vcc−4Vth).

When a reduction of the threshold voltage Vth is disregarded, or when the circuit is so designed that the threshold voltage Vth will not exist, a voltage about three times as high as the power voltage Vcc is generated at the output PUMP1.

As is explained while referring to FIG. 7, when a large capacitance at the first stage is set, the boosting efficiency of the voltage booster circuit can be increased. More specifically, when in FIG. 7 the capacitance of the capacitor C11 is greater than that of the capacitor C12, voltage {C11/(C11+C12)}×Vcc at the nodes N1 and N2 are increased upon the application of clock pulses, and the boosting efficiency is enhanced. Therefore, to improve the efficiency of the voltage booster circuit, it is preferable that the capacitance at the first stage be so set that it is greater than that at the succeeding stage.

Figure 11:
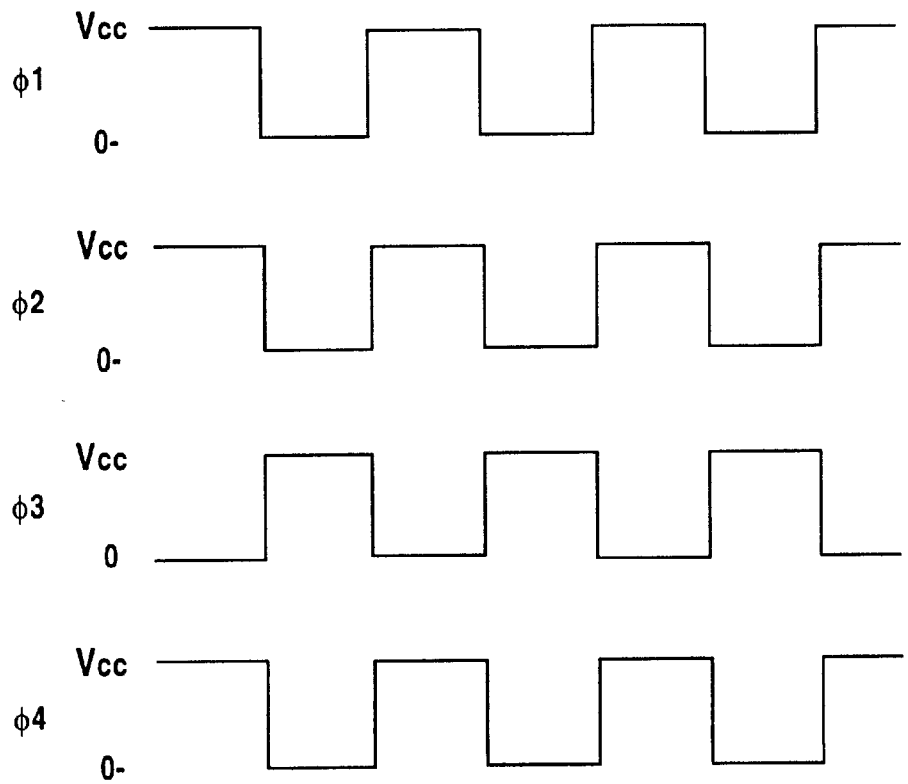
FIG. 11 is a diagram showing another combination of clock pulses applied to a voltage booster circuit.

FIG. 11 is a diagram showing another combination of clock pulses to be applied to the voltage booster circuit. For this combination, clock pulses φ1 and φ2 have the same phase, while clock pulse φ3 has the opposite phase and clock pulse φ4 has a phase opposite that of clock pulse 3. As a result, the capacitors C11+C12 at the first stage perform the same operation, and the capacitors C13 and C14 at the succeeding stages each performs its operation differently.

Figure 12:
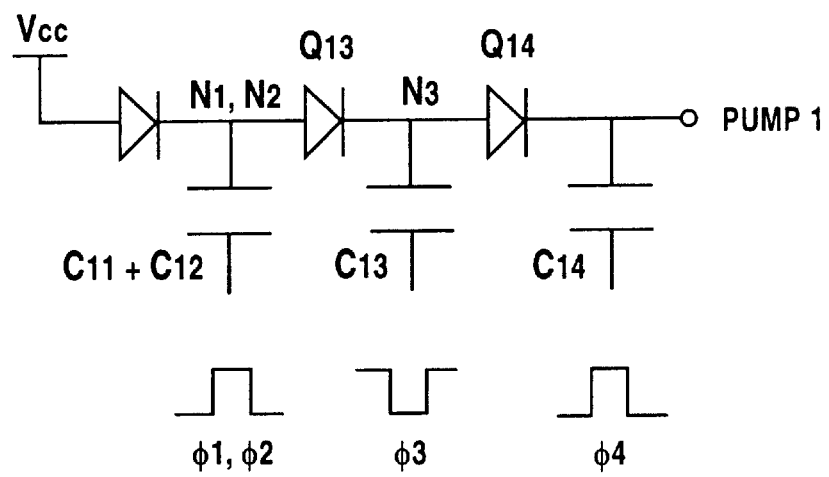
FIG. 12 is a diagram showing an equivalent circuit when the combination of clock pulses in FIG. 11 is applied.

FIG. 12 is a diagram showing an equivalent circuit when the combination of clock pulses in FIG. 11 is applied. As is described above, the equivalent circuit is constituted by three capacitors C11+C12, C13 and C14, and three diodes. The capacitance of the capacitor C11+C12 is greater than that for the capacitors C13 and C14 at the following stages, and boosting efficiency is increased.

When the threshold voltages for transistors connected as the diodes are disregarded, the voltages at the nodes N1 and n2 are raised to 2Vcc, the voltage at the node N3 is raised to 3Vcc, and the voltage at the output PUMP1 is raised to 4Vcc.

As is described above, the voltages at the nodes are lower when the combination of clock pulses in FIG. 5 is applied than when the combination of clock pluses in FIG. 4 is applied. Similarly, when the combination of clock pulses in FIG. 11 is applied, the voltages at the nodes are lowered. Therefore, when an increase in the power voltage Vcc is detected, the combination of clock pulses can be changed to adjust the boosting level of the voltage booster circuit.

Figure 13:
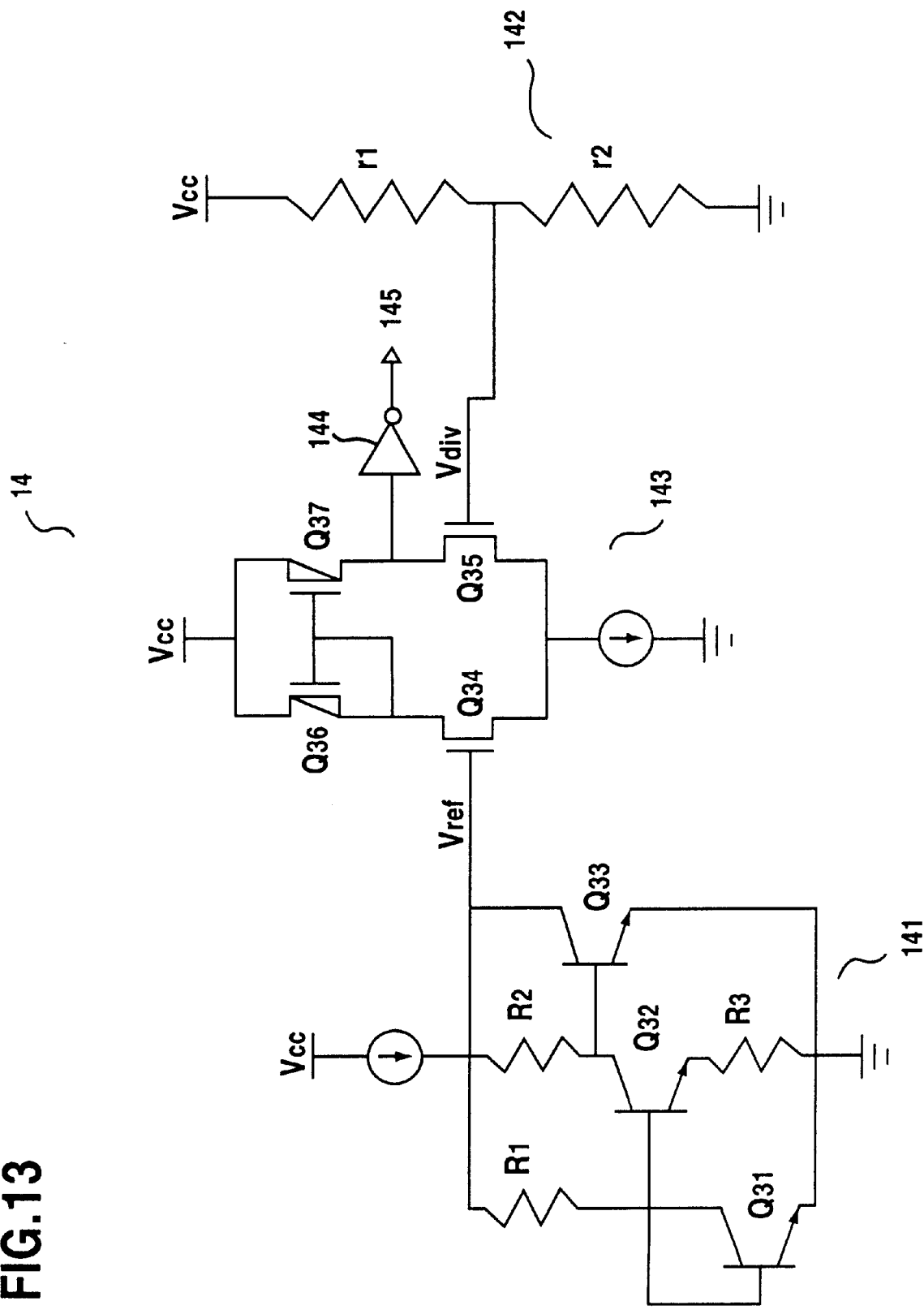
FIG. 13 is a diagram illustrating an example power voltage determination circuit.

FIG. 13 is a circuit diagram showing an example of the power voltage detection circuit 14 in FIG. 1. The detection circuit 14 is a circuit for detecting a change in the power voltage Vcc. The detection circuit 14 identifies, for example, a first condition wherein the power voltage Vcc is around 3 V, and a second condition wherein the power voltage Vcc is around 5 V. Or, the detection circuit 14 identifies a first condition wherein the power voltage Vcc is a rated voltage within a predetermined range, and a second condition wherein the power voltage Vcc is higher than the rated voltage.

In FIG. 13, a band gap reference circuit 141 is composed of bipolar transistors Q31, Q32 and Q33, and resistors R1, R2 and R3. Regardless of the power voltage Vcc, this circuit 141 generates a constant reference voltage Vref which is higher than the ground potential by the equivalent of a base-emitter voltage. A resistors divided circuit 142 is a circuit that divides the power supply voltage Vcc simply by resistors r1 and r2 to generate a potential Vdiv. The potential Vdiv, therefore, varies in occurrence with the change in the power voltage Vcc. A voltage comparator 143 is a differential circuit constituted by an N-MOS transistors Q34 and Q35, and P-MOS transistors Q36 and Q37. At a lower power voltage Vcc, the voltage Vdiv is lower than the reference voltage Vref, and an output 145 of an inverter 144 goes to level L. At a higher power voltage Vcc, the voltage Vdiv is higher than the reference voltage Vref, and the output 145 goes to level H.

Figure 14:
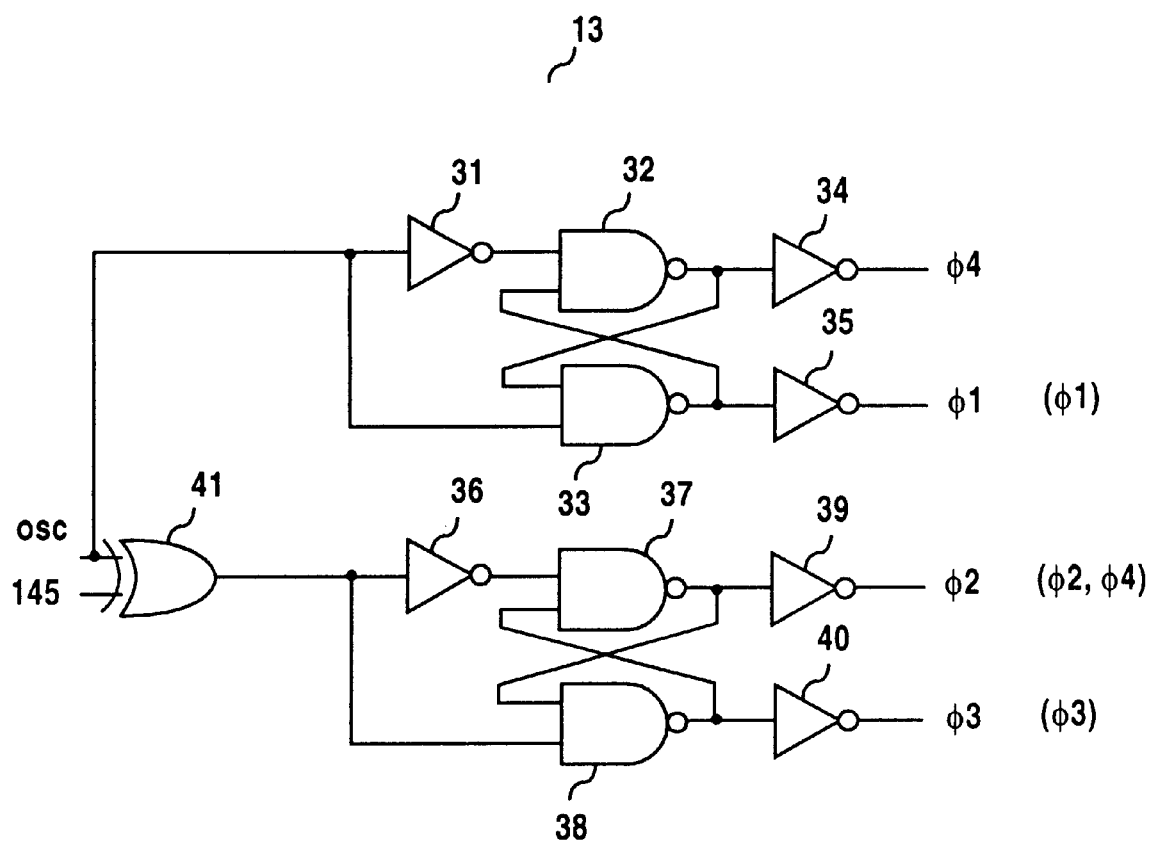
FIG. 14 is a diagram illustrating an example clock switching circuit.

FIG. 14 is a diagram illustrating one example of the clock switching circuit 13 shown in FIG. 1. This switching circuit 13 employs the output 145 of the power voltage detection circuit 14 to switch the combinations of clock pulses shown in FIGS. 4 and 5. The clock switching circuit 13 in FIG. 14 is constituted by a first latch circuit, including inverters 31, 34 and 45 and NAND gates 32 and 33, and a second latch circuit, including inverters 36, 39 and 40 and NAND gates 37 and 38. Clock pulse OSC from the oscillator 12 is directly supplied to the inverter 31 of the first latch circuit. The output of an EOR gate 41, which employs the output 145 of the detection circuit 14 to invert the phase of the clock pulse OSC output by the oscillator 12, is supplied to the inverter 36 of the second latch circuit.

Therefore, when the detection circuit 14 detects the first condition wherein the power source voltage Vcc is at a low level, the output 145 is at level L, and the output OSC of the oscillator 12 in the same phase is supplied to the inverters 31 and 36, so that the clock pulses φ1 and φ3 have the same phase while the clock pulses φ2 and φ4 have opposite phase. In other words, the clock pulse combination shown in FIG. 4 is generated.

On the other hand, when the detection circuit 14 detects the second condition wherein the power source voltage Vcc is at a high level, the output 145 is at level H and the inverted output OSC of the oscillator 12 is supplied to the inverter 36 of the second latch circuit. As a result, the clock pulses φ1 and φ2 have the same phase and the clock pulses 3 and φ4 have the opposite phase. In other words, the combination of clock pulses shown in FIG. 5 is generated.

When clock pulses φ1 to φ4 are applied as is indicated by the parentheses in FIG. 14, the clock switching circuit switches the combination of clock pulses in FIG. 4 with that in FIG. 11. In this case, it is preferable that, to ensure driving capacity, an inverter 39 be provided in parallel to generate clock pulses φ2 and φ4.

Figure 15:
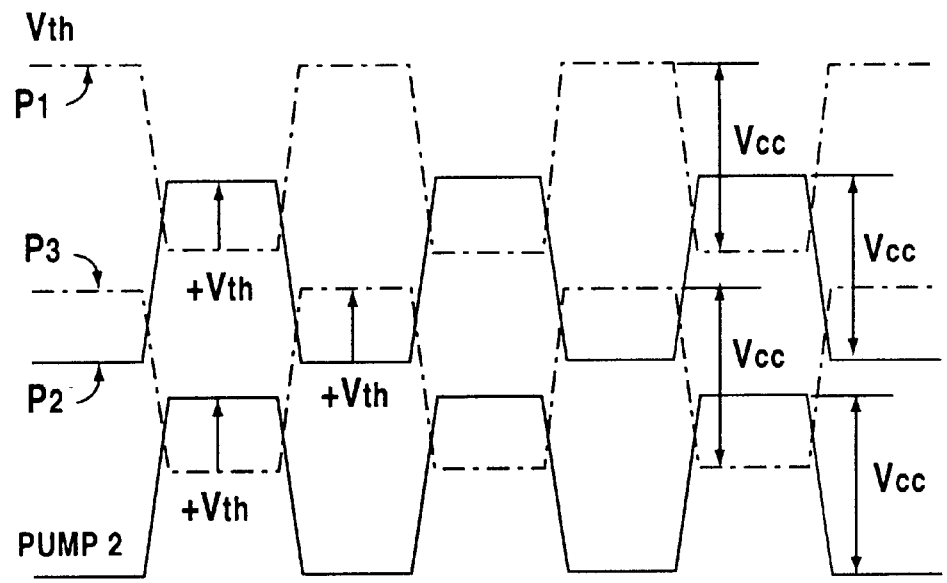
FIG. 15 is a signal waveform diagram in a normal condition when the combination of clock pulse in FIG. 4 is applied to the voltage drop circuit in FIG. 3.

FIG. 15 is a diagram showing signal waveforms at nodes P1 to P3 and the output PUMP2 in the normal condition wherein the combination of clock pulses shown in FIG. 4 is applied to the voltage drop circuit in FIG. 3. In the voltage drop circuit, since transistors Q21, Q22, Q23 and Q24 that are connected as diodes are P MOS transistors, the electric charges in capacitors are transferred from the last stage to the first stage.

Consider the transistors Q21 and Q22 connected as the diodes and the capacitor C21 in FIG. 3, and clock pulse φ1. When clock pulse 1 goes from level L to level H, the electric charge in the capacitor C21 is transferred via the transistor Q21 to the power source ground GND, and then, when clock pulse φ1 goes from level H to level L, the electric charge is absorbed by the capacitor C22 via the transistor Q22. Therefore, if the threshold voltage Vth of the transistor Q22 is disregarded, the potentials at the nodes P1 and P2 are dropped from the ground potential by the equivalent of a voltage which is obtained by distributing pulse amplitude Vcc of the clock pulse at a ratio of the capacitances of the capacitors C21 and C22. By repeating this operation, the potential at the node P1 is dropped to a level lower than the ground potential by the equivalent of the power source Vcc; the potential at the node P2 is dropped to a level lower by the equivalent of about 2Vcc; the potential at the node P3 is dropped to a level lower by the equivalent of about 3Vcc; and the potential at the output PUMP2 is dropped to a level lower by the equivalent of about 4Vcc.

More accurately, the potential at the node P1 is higher than the ground potential by the equivalent of the threshold voltage Vth, and the potential at the nodes on both sides of the transistor differ by the equivalent of the threshold voltage Vth. The potentials at the nodes P1 to P3 and the output PUMP are as follows:

P1: Vth Vth−Vcc

P2: 2Vth−Vcc (2Vth−Vcc)−Vcc

P3: 3Vth−2Vcc (2Vth−2Vcc)−Vcc

PUMP2: 4Vth−3Vcc (4Vth−3Vcc)−Vcc.

The signals are as is shown in FIG. 15.

Figure 16:
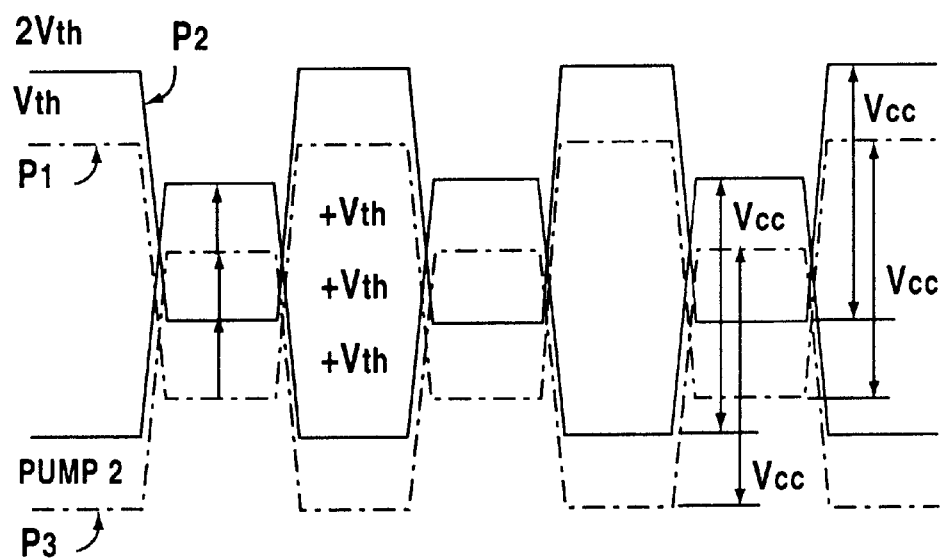
FIG. 16 is a signal waveform diagram in a normal condition when the combination of clock pulses in FIG. 5 is applied to the voltage drop circuit in FIG. 3.

FIG. 16 is a diagram showing signal waveforms for nodes P1 to P3 and the output PUMP2 in the normal condition wherein the combination of clock pulses in FIG. 5 are applied to the voltage drop circuit in FIG. 3. As also does the circuit in FIGS. 10A and 10B, the circuit acts as a two-stage voltage drop circuit consisting of a capacitor C21+C22 and a capacitor C23+C24. Thus, the potentials at the nodes P1 and P2 are changed in the same way while having a difference therebetween of the threshold voltages Vth, and the potentials at the nodes P3 and output PUMP2 are changed in the phase opposite to that, while having a difference therebetween of the threshold voltages Vth.

In other words, the potentials at the nodes and the output PUMP2 in FIG. 16 are as follows:

P1: Vth Vth−Vcc

P2: 2Vth 2Vth−Vcc

P3: 3Vth−Vcc (3Vth−Vcc)−Vcc

PUMP2: 4Vth−Vcc (4Vth−Vcc)−Vcc.

Therefore, when the threshold voltage is reduced, the voltage at the output PUMP2 is lowered from the ground potential by the equivalent of twice the power voltage Vcc.

Similarly, when the combination of clock pulses in FIG. 11 is to be applied to the voltage drop circuit in FIG. 3, a voltage lower than the ground potential by the equivalent of three times the power voltage Vcc is generated at the output PUMP2. In addition, since the capacitances at the first stage are increased to those of the capacitors C21 and C22, the voltage drop efficiency can be enhanced.

Figure 17:
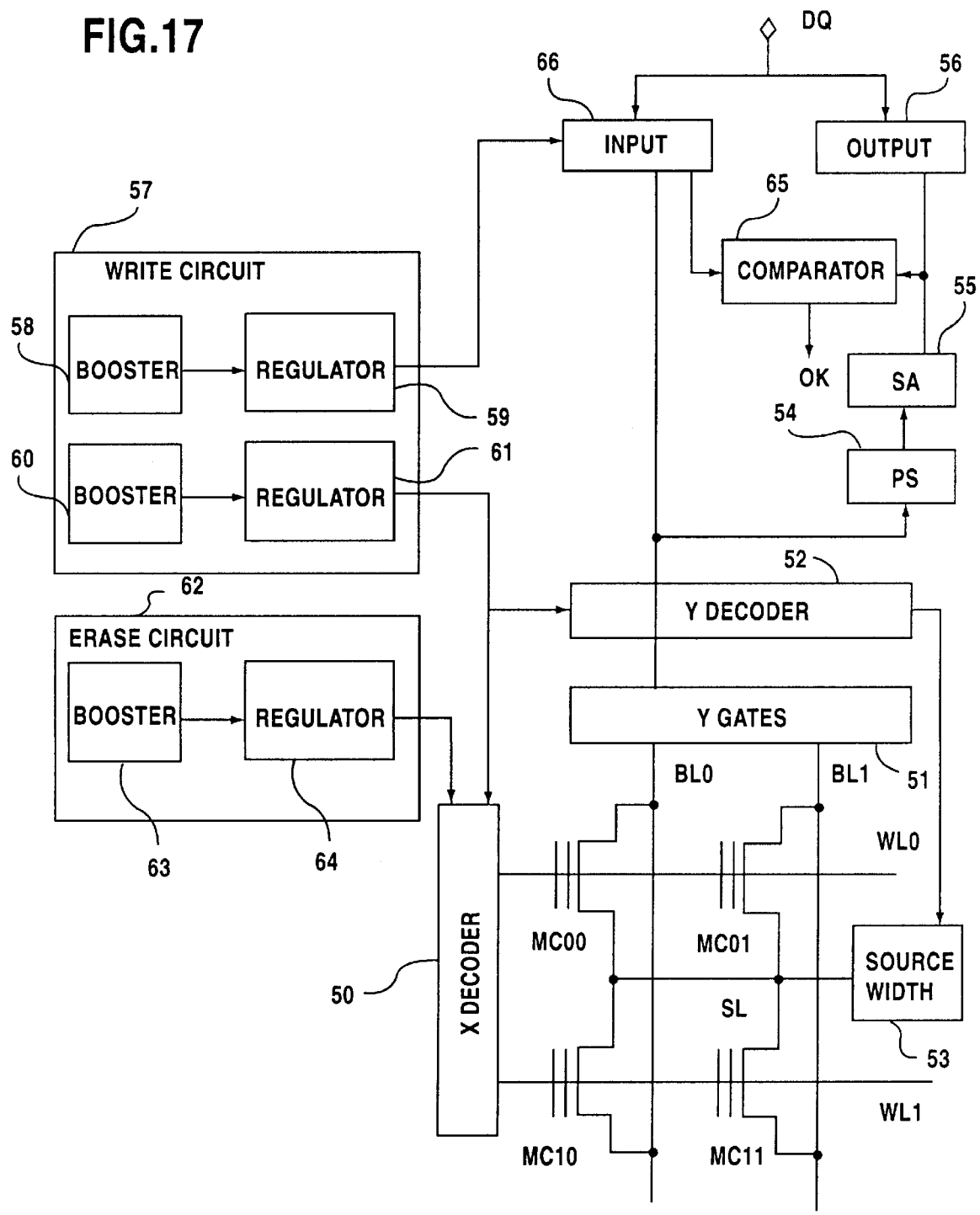
FIG. 17 is a diagram illustrating an example wherein the voltage booster circuit and the voltage drop circuit are applied for a nonvolatile semiconductor memory.

FIG. 17 is a circuit diagram illustrating an example where the voltage booster circuit and the voltage drop circuit described above are applied for a nonvolatile semiconductor memory. In this example, memory cells MC00 to MC11, of a floating gate type, are provided at the intersections of word lines WL0 and WL1, and bit lines BL0 and BL1. The word line is selected by an X decoder and is driven at a predetermined potential. The bit line is selected by Y gate 51 and is output as output DQ via a pre-sense circuit 54, a sense amplifier 55 and an output circuit 56. Y decoder 52 generates a selection signal to select the Y gate 51 and transmits it to the Y gate 51. The source terminal of each memory cell MC is connected to a source switching circuit 53, and the potential at the source terminal is controlled between writing (programming) and erasing.

The relationship between the word lines, bit lines and the potentials at the source terminals during the writing and during the erasing is shown in a table in FIG. 17. As is shown in the table, during the writing, a voltage that is 9 V higher than the power voltage Vcc is applied to the word line, and a voltage of 5 V that is equal to or higher than the power voltage Vcc is applied to the bit line. During the erasing, a voltage that is −10 V lower than the ground potential is applied to the word line. A writing circuit 57 includes voltage booster circuits 58 and 60, while an erasing circuit 62 includes a voltage drop circuit 63. Regulators 59, 61 and 64 are provided on the output sides of the voltage booster circuits and the voltage drop circuit to set a desired voltage value. In other words, a voltage is raised or dropped to a specified level by the voltage booster circuit or by the voltage drop circuit, and the resultant voltage is adjusted to a predetermined voltage by the regulators. Therefore, a raised or dropped voltage in a certain range is generated by the voltage booster circuit or the voltage drop circuit.

The word line potential of 9 V for a writing operation is generated by the voltage booster circuit 60 and the regulator 61 in the writing circuit 57, and is supplied to the X decoder 50. The bit line voltage of 5 V for a writing operation is generated by the voltage booster circuit 58 and the regulator 59 in the writing circuit 57. The high voltage of 5 V is applied to the bit line only when data 0 is to be written to a memory cell via an input circuit 66.

The voltage drop circuit 63 of the erasing circuit 62 generates the word line voltage of −10 V for an erasing operation, and is applied to the X decoder 50. Normally, a low voltage of −10 V for erasing is applied to all the word lines in a sector, and data erasing (writing of data 1) is performed for all of the memory cells in the sector.

When data from the sense amplifier 55 is compared with the data from the input circuit 66, and these data match, a confirmation signal OK is emitted and the writing or erasing operation is completed.

Upon the application of a power voltage Vcc of 3 V, as is described above, the combination of clock pulses in FIG. 4, for example, is supplied to the voltage booster circuit and to the voltage drop circuit. Upon the application of a power voltage Vcc of 5 V, the combination of clock pulses in FIG. 5 or FIG. 11 is supplied to the voltage booster circuit and the voltage drop circuit to reduce the stress on the transistors and the capacitors in the circuit. The amplitude of the clock pulse output by the oscillator becomes greater in association with the high power voltage. Therefore, even when the combination of clock pulses is changed to lower the increase in the voltage or the reduction in the voltage, the same potentials can be generated at the raised voltage output PUMP1 and at the dropped voltage PUMP2.

Although the combinations of clock pulses are shown in FIGS. 4, 5 and 11, other combinations can be employed to provide predetermined increases or drops in voltages. A preferable combination of clock pulses is one with which the capacitance can be substantially increased at the first stage, because the voltage boosting level can be reduced and the voltage drop level can be increased with little deterioration of the current supply capacity.

As is described above, according to the present invention, a combination of clock pulses to be supplied to the voltage booster circuit and the voltage drop circuit can be changed as needed, and the magnitudes for voltage boosting and for voltage dropping can be changed in accordance with the existing condition. In addition, since a proper combination of clock pulses is selected, a desired raised voltage and dropped voltage can be selected. Therefore, when a desired voltage is selected in accordance with a power voltage level, damage to the devices in the voltage booster circuit and in the voltage drop circuit can be prevented.

Further, when the combination of clock pulses is changed in accordance with a conditional change other than the change in the power voltage, the voltage boosting level and the voltage drop level can be changed without altering the structures of the voltage booster circuit and of the voltage drop circuit.

What is claimed is:

1. A voltage booster circuit comprising:
   a plurality of diode means serially connected in a series of stages;

a plurality of capacitors, first electrodes of which are connected to connection points of said diode means, said plurality of capacitors receiving pulse signals at second electrodes thereof and a raised voltage is output to a last stage of said diode means; and pulse generation means for generating first, second, third and fourth pulse signals, the second pulse signal having a phase opposite to a phase of said first pulse signal, and the fourth pulse signal having a phase opposite to a phase of said third pulse signal, wherein, in a first condition, for supplying the first pulse signal to said second electrodes of odd numbered capacitors and for supplying the second pulse signal to said second electrodes of even numbered capacitors, and, in a second condition differing from said first condition wherein said plurality of capacitors are divided into groups, each group including at least plural adjacent capacitors, for supplying the third pulse signal to said second electrodes of at least one odd numbered group of capacitors and for supplying the fourth pulse signal to said second electrodes of at least one even numbered group of capacitors.

2. A voltage booster circuit comprising:

a plurality of diode means, serially connected in a series of stages, for transferring electric charges from a first stage toward a last stage;

a plurality of capacitors having first electrodes which are connected to connection points of said diode means and having second electrodes to which pulse signals are applied to raise voltages at said connection points; and a pulse generator for generating first, second, third and fourth pulse signals, the second pulse signal having a phase opposite to a phase of the first pulse signal, the fourth pulse signal having a phase opposite to a phase of the third pulse signal, and wherein, in a first condition, for supplying the first pulse signal to said second electrodes of odd numbered capacitors of said plurality of capacitors and for supplying the second pulse signal to said second electrodes of even numbered capacitors of said plurality of capacitors, and, in a second condition differing from said first condition, for supplying the third pulse signal to said second electrodes of a plurality of adjacent capacitors which are connected to said first stage and at least one adjacent stage to said first stage, and for supplying the fourth pulse signal to said second electrode of at least one remaining capacitor of a remaining stage.

3. A voltage booster circuit comprising:

a plurality of diode means, serially connected in a series of stages, for transferring electric charges from a first stage toward a last stage;

a plurality of capacitors, having first electrodes which are connected to connection points of said diode means and having second electrodes to which pulse signals are applied to raise voltages at said connection points; and a pulse generator for generating first, second, third and fourth pulse signals, the first and second pulse signals having opposite phases and the third and fourth pulse signals having opposite phases, wherein, in a first condition, for supplying the first and second pulse signals to said second electrodes of said capacitors alternately for every N capacitors, where N is an integer of 1 or greater, and, in a second condition differing from said first condition, for supplying the third and fourth pulse signals to said second electrodes of said capacitors alternately for every M capacitors, where M is an integer of 1 or greater and M is different from N.

4. A voltage booster circuit comprising:

a plurality of diode means, serially connected in a series of stages, for transferring electric charges from a first stage toward a last stage;

a plurality of capacitors, first electrodes of which are connected to connection points of said diode means, said plurality of capacitors receiving pulse signals at second electrodes thereof to raise a voltage at said connection points;

a pulse generator for generating at least two pulse signals having opposite phases, wherein, in a first condition, applying a first combination of the pulse signals to said second electrodes of said capacitors, and, in a second condition differing from said first condition, applying a second combination of the pulse signals, which differs from said first combination, to said second electrodes of said capacitors.

5. A voltage booster circuit according to claim 4, wherein in said first condition, said pulse generator supplies pulse signals having the same phase to N capacitors (N is an integer of 1 or greater) which are adjacent to each other at said first stage, and in said second condition, said pulse generator supplies said pulse signals having same phase to M capacitors (M is an integer of 1 or greater and different from N) which are adjacent to each other at said first stage.

6. A voltage drop circuit comprising:

a plurality of diode means, serially connected in a series of stages, for transferring electric charges from a last stage toward a first stage;

a plurality of capacitors, having first electrodes which are connected to connection points of said diode means and having second electrodes to which pulse signals are applied to reduce voltages at said connection points; and a pulse generator for generating first, second, third and fourth pulse signals, the second pulse signal having a phase which is opposite to a phase of the first pulse signal, the fourth pulse signal having a phase which is opposite to the third pulse signal, and wherein, in a first condition, for supplying the first pulse signal to said second electrodes of odd numbered capacitors of said plurality of capacitors and for supplying the second pulse signal to said second electrodes of even numbered capacitors of said plurality of capacitors, and, in a second condition differing from said first condition, for supplying the third pulse signal to said second electrodes of a plurality of adjacent capacitors which are connected to said first stage and at least one adjacent stage to said first stage, and for supplying the fourth pulse signal to said second electrode of at least one remaining capacitor of a remaining stage.

7. A voltage drop circuit comprising:

a plurality of diode means, serially connected in a series of stages, for transferring electric charges from a last stage toward a first stage;

a plurality of capacitors, having first electrodes which are connected to connection points of said diode means and having second electrodes to which pulse signals are applied to reduce voltages at said connection points; and a pulse generator for generating first, second, third and fourth pulse signals, the first and second pulse signals having opposite phases and the third and fourth pulse signals having opposite phases, wherein in a first condition, for supplying the first and second pulse signals to said second electrodes of said capacitors alternately for every N capacitors, where N is an integer of 1 or greater, and, in a second condition differing from said first condition, for supplying the third and fourth pulse signals to said second electrodes of said capacitors alternately for every M capacitors, where M is an integer of 1 or greater and M is different from N.

8. A voltage drop circuit comprising:

a plurality of diode means, serially connected in a series of stages, for transferring electric charges from a last stage toward a first stage;

a plurality of capacitors, first electrodes of which are connected to connection points of said diode means, said plurality of capacitors receiving pulse signals at second electrodes thereof to drop a voltage at said connection points;

a pulse generator for generating at least two pulse signals having opposite phases, wherein, in a first condition, for applying a first combination of the pulse signals to said second electrodes of said capacitors, and, in a second condition differing from said first condition, applying a second combination of the pulse signals which differs from said first combination, to said second electrodes of said capacitors.

9. A voltage drop circuit according to claim 8, wherein in said first condition, said pulse generator supplies pulse signals having the same phase to N capacitors (N is an integer of 1 or greater) adjacent to each other at said first stage, and in said second condition, said pulse generator supplies said pulse signals having same phase to M capacitors (M is an integer of 1 or greater and different from N) adjacent to each other at said first stage.

10. A voltage booster circuit according to one of claims 1 through 5, being in said first condition when a power voltage is at a first level and in said second condition when said power voltage is at a second level higher than said first level.

11. A voltage drop circuit comprising:

a plurality of diode means serially connected in a series of stages;

a plurality of capacitors, first electrodes of which are connected to connection points of said diode means, said plurality of capacitors receiving pulse signals at second electrodes thereof and a dropped voltage is output to a last stage of said diode means; and pulse generation means for generating first, second, third and fourth pulse signals, the second pulse signal having a phase opposite to a phase of said first pulse signal, and the fourth pulse signal having a phase opposite to a phase of said third pulse signal, wherein, in a first condition, for supplying the first pulse signal to said second electrodes of odd numbered capacitors and for supplying the second pulse signal to said second electrodes of even numbered capacitors, and, in a second condition differing from said first condition wherein said plurality of capacitors are divided into groups, each group including at least plural adjacent capacitors, for supplying the third pulse signal to said second electrodes of at least one odd numbered group of capacitors and for supplying the fourth pulse signal to said second electrodes of at least one even numbered group of capacitors.

12. A voltage drop circuit according to one of claims 6, 7, 8, 9 or 11, being in said first condition when a power voltage is at a first level and in said second condition when said power voltage is at a second level higher than said first level.

* * * * *